(12) United States Patent
Zheng

(10) Patent No.: US 7,044,470 B2
(45) Date of Patent: May 16, 2006

(54) ROTARY FACE SEAL ASSEMBLY

(75) Inventor: Xiaoqing Zheng, East Greenwich, RI (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 09/903,313

(22) Filed: Jul. 11, 2001

(65) Prior Publication Data

US 2002/0014743 A1 Feb. 7, 2002

Related U.S. Application Data

(60) Provisional application No. 60/217,584, filed on Jul. 12, 2000.

(51) Int. Cl.
*F16J 15/34* (2006.01)

(52) U.S. Cl. .................. 277/400; 277/401; 277/408

(58) Field of Classification Search .............. 277/39.9, 277/400, 401, 408, 377, 379, 385, 388, 503, 277/426
See application file for complete search history.

(56) References Cited

U.S. PATENT DOCUMENTS

| | | | | |
|---|---|---|---|---|
| 2,907,594 A | * | 10/1959 | Macks | 277/401 |
| 3,109,658 A | * | 11/1963 | Barrett et al. | 277/400 |
| 3,383,033 A | | 5/1968 | Moore | |
| 3,727,924 A | * | 4/1973 | Henderson | 277/388 |
| 3,751,045 A | * | 8/1973 | Lindeboom | 277/379 |
| 3,759,532 A | | 9/1973 | Lindeboom | |
| 3,782,737 A | * | 1/1974 | Ludwig et al. | 277/400 |
| 4,071,253 A | * | 1/1978 | Heinen et al. | 277/369 |
| 4,645,414 A | * | 2/1987 | DeHart et al. | 277/400 |
| 5,201,531 A | * | 4/1993 | Lai | 277/400 |
| 5,398,943 A | * | 3/1995 | Shimizu et al. | 277/400 |
| 5,435,574 A | * | 7/1995 | Victor et al. | 277/379 |
| 5,609,342 A | * | 3/1997 | Peterson et al. | 277/399 |
| 5,769,604 A | | 6/1998 | Gardner et al. | |
| 6,135,458 A | * | 10/2000 | Fuse | 277/382 |
| 6,145,840 A | * | 11/2000 | Pope | 277/348 |
| 6,152,452 A | * | 11/2000 | Wang | 277/399 |
| 6,213,473 B1 | * | 4/2001 | Lebeck | 277/387 |

FOREIGN PATENT DOCUMENTS

| | | |
|---|---|---|
| DE | 3819566 A1 | 6/1988 |
| DE | 94 07 733.9 | 5/1994 |
| FR | 2385 013 | 3/1977 |

(Continued)

OTHER PUBLICATIONS

Bagepalli, et al., "Dynamic Analysis of An Aspirating Face Seal for Aircraft-Engine Applicaton" Published by the American Institute of Aeronautics and Astronautics (AIAA), 1996.

(Continued)

*Primary Examiner*—Alison K. Pickard
(74) *Attorney, Agent, or Firm*—Iandiorio & Teska

(57) ABSTRACT

A rotary seal assembly including a first member having a sealing face and a second member having a sealing face with a number of pumping grooves therein. At least a first set of pumping grooves stating proximate a center portion of the sealing face and extending outward and at least a second set of pumping grooves starting proximate the center portion of the sealing face and extending inward to direct fluid fed to the center portion of the sealing face simultaneously both inwardly and outwardly from the center portion of the sealing face to provide a uniform fluid film thickness between the sealing faces of the first and second members when one sealing face cones due to thermal and/or pressure effects.

59 Claims, 12 Drawing Sheets

FOREIGN PATENT DOCUMENTS

| | | |
|---|---|---|
| FR | 2385013 | 10/1978 |
| JP | 1973/026094 | 8/1973 |
| JP | 62270869 | 11/1987 |
| JP | 2146374 | 6/1990 |
| JP | 2199375 | 8/1990 |
| JP | 2277874 | 11/1990 |
| JP | 4-78379 * | 3/1992 |
| JP | 4171370 | 6/1992 |
| JP | H06-085967 | 12/1994 |

OTHER PUBLICATIONS

Zheng et al., "Adaptive Divert Double-Sprial Groove Face Seals for High Speed, High Temperature Applications." American Institute of Aeronautics 00-3373 (2000).

* cited by examiner

ROTARY FACE SEAL ASSEMBLY

RELATED APPLICATIONS

This application claims priority from Provisional Application Ser. No. 60/217,584 filed Jul. 12, 2000.

FIELD OF THE INVENTION

This invention relates to a rotary face seal assembly useful, for example, in connection with turbomachines.

BACKGROUND OF THE INVENTION

Rotary face seals typically include a stator or sealing ring fixed in place and a rotor or mating ring which rotates with a rotating machine part such as a shaft. The sealing faces of both the sealing ring and the mating ring are very close together but not touching. A pressurized fluid film (e.g., air) is formed between the sealing faces to separate them and prevent wear due to friction.

The fluid film is typically formed by a set of spiral grooves cut into the sealing face of either the mating ring or the sealing ring. When the mating ring rotates, the fluid is forced (pumped) from the outer diameter of the two rings inward to the inner diameter (or vice versa) with sufficient pressure to separate the sealing faces and form the sealing layer. See U.S. Pat. No. 5,769,604 incorporated herein by this reference.

Non-contacting, film-riding face seals have been used for industrial applications successfully ever since they were first introduced in 1969. Face seals are characterized by extremely low leakage and low wear. Because of these features, there has been a continuous effort in the aerospace industry to develop non-contacting face seals for large diameter gas turbine engines.

There are, however, two major difficulties associated with using face seals for high rotational speed and large shaft diameter turbomachines. First, it is difficult to control the flatness of the seal faces because of their size. Second, the seal faces of both the rotor and stator can cone either inward or outward due to large thermal and pressure effects. A negative deflection causing a divergent flow path can be disastrous for standard hydrodynamic face seals since the flow of gas into the region between the faces is then cut off. With standard hydrodynamic face seals, the deflection is expected to be much larger than the film thickness than the face seal runs on. Large positive coning can also result in failure for large diameter face seals because the resulting weak film stiffness increases the chance of face contact.

Realizing that conventional spiral groove face seals will not survive the harsh environment encountered in large turbine engines, the '604 patent proposes a spiral groove design which initially showed some promise in large turbine engine applications. Two sets of seal sections, two feed grooves, and an additional dam section are used for the face seal. This configuration increases the film stiffness about three times compared to a conventional spiral groove face seal design providing the stator with more power to adapt to the deflection of the rotor. The major limitation with the design set forth in the '604 patent, however, is that it always has a seal section pumping from an edge (the outer diameter) to the center thus limiting the ability to prevent edge contact. In addition, the seal pumping groove configuration disclosed in the '604 patent is fairly complicated.

SUMMARY OF THE INVENTION

It is therefore an object of this invention to provide a better rotary face seal assembly.

It is a further object of this invention to provide such a rotary face seal assembly which can be used with large shaft diameter turbomachines.

It is a further object of this invention to provide such a rotary face seal assembly which is unaffected by coning of either the stator or the rotor.

It is a further object of this invention to provide such a rotary face seal assembly designed to provide a uniform fluid film thickness between the sealing faces even when one sealing face cones due to thermal and/or pressure effects.

It is a further object of this invention to provide such a rotary face seal assembly which is versatile in design.

It is a further object of this invention to provide such a rotary face seal assembly which is less complicated in design.

It is a further object of this invention to provide such a rotary face seal assembly which is designed to direct (pump) fluid simultaneously both inwardly and outwardly from the center portion of the sealing faces.

This invention results from the realization that a better rotary face seal assembly which maintains a uniform fluid film thickness between the sealing faces of the rotor and the stator even when one sealing face cones in or out due to thermal and/or pressure effects is effected by a pumping groove design on the sealing face of either the rotor or the stator which directs (pumps) fluid simultaneously both inwardly and outwardly from the center portion of the sealing face.

This invention features a rotary seal assembly comprising a first member having a sealing face and a second member having a sealing face with a number of pumping grooves therein. At least a first set of pumping grooves start proximate a center portion of the sealing face and extend outward. At least a second set of pumping grooves start proximate the center portion of the sealing face and extend inward. In this way, fluid fed to the center portion of the sealing face is directed simultaneously both inwardly and outwardly from the center portion of the sealing face to provide a uniform fluid film thickness between the sealing faces of the first and second members when one sealing face cones due to thermal and/or pressure effects.

There is also a feeding groove for providing fluid to the center portion of the sealing face. In one example, the feeding groove is in the first member. In another example, the feeding groove is in the second member and positioned at the center portion of the sealing face thereof.

The feeding groove may be discontinuous forming a number of feeding groove sections. Each feeding groove section then has an orifice which may be angled. The feeding groove may also be continuous. In this example, there are a number of spaced orifices in the continuous feeding groove which may be angled.

In one example, the first member is a stator ring and the second member is a rotor ring. Alternatively, the first member is a rotor ring and the second member is a stator ring.

Typically, the first set of pumping grooves each have a terminal end located inward of an outer portion of the sealing face and the second set of pumping grooves each have a terminal end located inward of an inner portion of the sealing face. In one example, the first set of pumping grooves and the second set of pumping grooves start adjacent each other at the center portion of the sealing face. In another embodiment, the starting position of the first set of pumping grooves are offset from the starting position of the second set of pumping grooves. The first set of pumping grooves may curve outwardly from the center portion of the sealing face and the second set of pumping grooves may curve inwardly from the center portion of the sealing face. In the preferred embodiment, all the pumping grooves have a width greatly exceeding their depth. Each pumping groove may have an inside edge and an outside edge, both edges curving inwardly. Typically, each set of pumping grooves includes the same number of pumping grooves. The feeding grooves may have a rounded bottom or a square bottom.

In one embodiment, there is a holder mounted to whichever member is the stator and movable therewith and a spring which biases the first and second members apart. A gap between the holder and the stator member is responsive to system pressure to thus overcome the spring at a predetermined level. Typically, the holder includes a shaft fixed thereto, the spring disposed about the shaft and abutting a non-movable member.

Also, the holder for the stator is configured to allow the stator to cone negatively when the rotor cones positively and also allows the stator to cone positively when the rotor cones negatively.

In one example, a first member has a sealing face with feeding orifices therein; and a second member has a sealing face with a number of pumping grooves therein, at least a first set of pumping grooves starting proximate a center portion of the sealing face and extending outward and at least a second set of pumping grooves starting proximate the center portion of the sealing face and extending inward to direct fluid fed to the center portion of the sealing face of the second member by the feeding orifices of the first member simultaneously both inwardly and outwardly from the center portion of the sealing face of the second member to provide a uniform fluid film thickness between the sealing faces of the first and second members when one sealing face cones due to thermal and/or pressure effects.

A complete rotary face seal assembly in accordance with this invention includes a stator having a sealing face and a rotor having a sealing face in close proximity to the sealing face of the stator. There is a holder for the stator having a back seat which allows the stator to cone negatively with the rotor cones positively and vice versa. The sealing face of the rotor (or the stator) is partitioned into at least first and second sections, the first section having pumping grooves which extend inwardly, the second section having pumping grooves which extend outwardly. The sealing face of the stator (or the rotor) has feeding orifices therethrough to direct fluid to the inwardly directed pumping grooves and the outwardly directed pumping grooves simultaneously thereby causing the stator to cone negatively with the rotor cones positively and vice versa.

The outwardly extending pumping grooves start proximate a center portion of the sealing face of the rotor (or the stator) and extend outward and the inwardly extending pumping grooves start proximate the center portion of the sealing face of the rotor (or the stator) and extend inward to direct fluid fed to the center portion of the sealing face by the orifices simultaneously both inwardly and outwardly from the center portion of the sealing face. Typically, the feeding orifices are disposed in a feeding groove formed in the face of the rotor (or the stator).

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
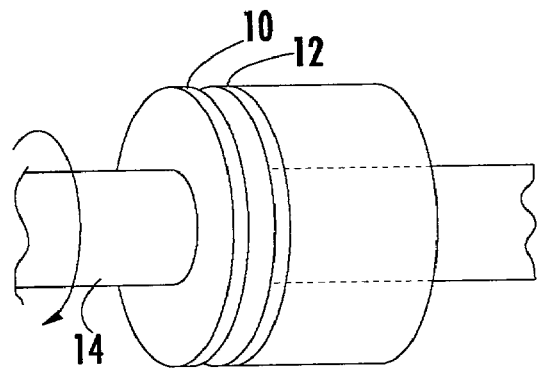
FIG. 1 is a schematic three dimensional view showing the primary components associated with a rotary face seal.

Rotary face seal assemblies typically include first member 10, FIG. 1 (e.g., a rotor or mating ring) closely adjacent but not touching second member 12 (e.g., a stator or sealing ring). Although rotor 10 is shown mounted on shaft 14, it could be mounted on other rotating portions of various machinery. A pressurized fluid film is formed between the sealing faces of rotor 10 and stator 12 as discussed in the Background section above.

As delineated in the Background section, prior art rotary face seal assemblies work satisfactorily when the outer diameter of both the rotor and the stator sealing rings is about 4 inches or less.

Figure 2:
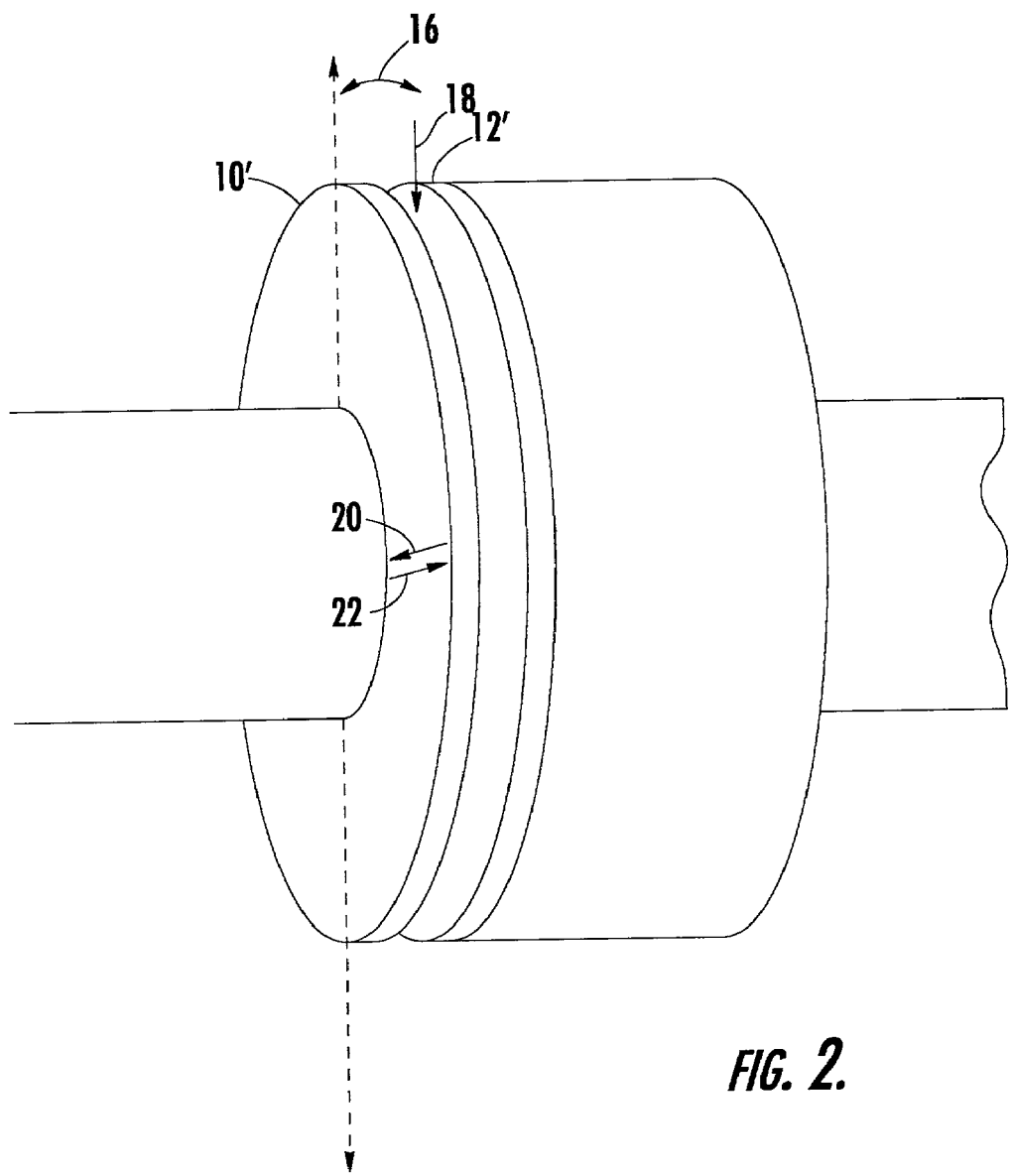
FIG. 2 is a schematic view similar to FIG. 1 except now the diameter of the rotary face seal is much larger and subject to coning.

Turbomachines, however, require rotors and stators much larger in size (e.g., 8 inches outside diameter and larger). As shown in FIG. 2, these larger size sealing members 10' and 12' can cone either inwardly or outwardly as shown by arrow 16 due to large thermal and/or pressure effects. Since prior art sealing faces directed (pumped) fluid from the outer diameter of members 10' and 12' to the inner diameter thereof as shown at 18 (or vice versa), when rotor 10' cones inward, the flow of gas is cut off resulting in failure of the large diameter face seals.

In the subject invention, in contrast, fluid is simultaneously directed both inwardly towards the inner diameter of the sealing rings as shown at 20 and also outwardly towards the outer diameter of the sealing rings as shown at 22 from the center portion of the sealing faces. Therefore, the gas supply will never be cut off in case of face coning as shown at 16. Furthermore, the flexible design of the stator ring and the divert double groove sections enable the seal ring to respond correctly to the mating face coning and result in a uniform fluid film thickness between the sealing faces as demonstrated in FIGS. 17–20.

Figure 3:
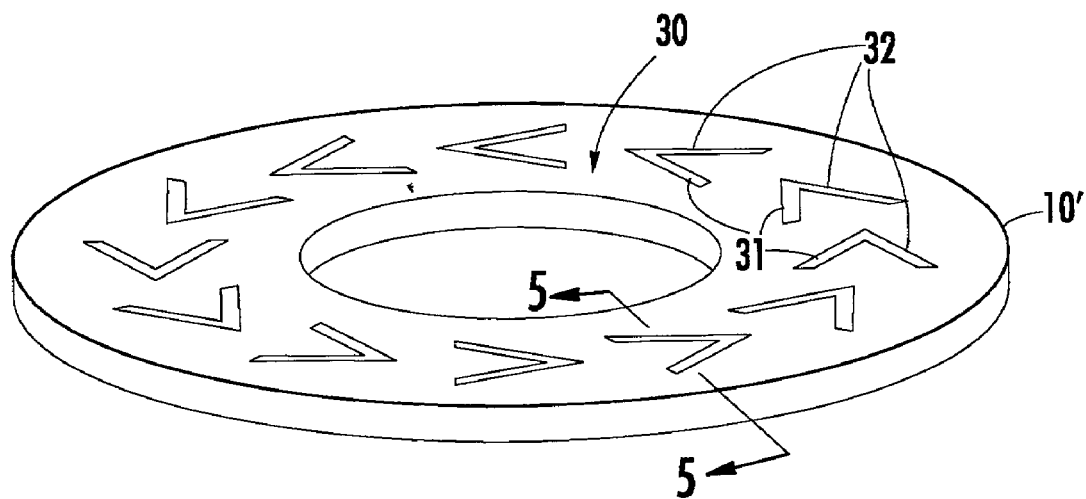
FIG. 3 is a schematic three-dimensional view showing the sealing face of the rotor of the subject invention.
Figure 4:
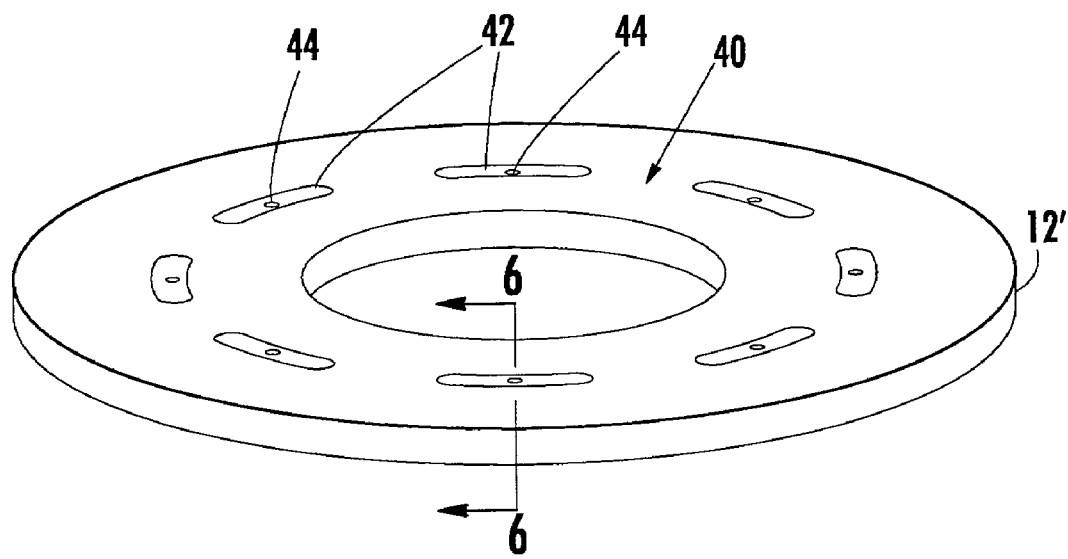
FIG. 4 is a schematic view showing the sealing face of the stator of the subject invention.
Figure 5:
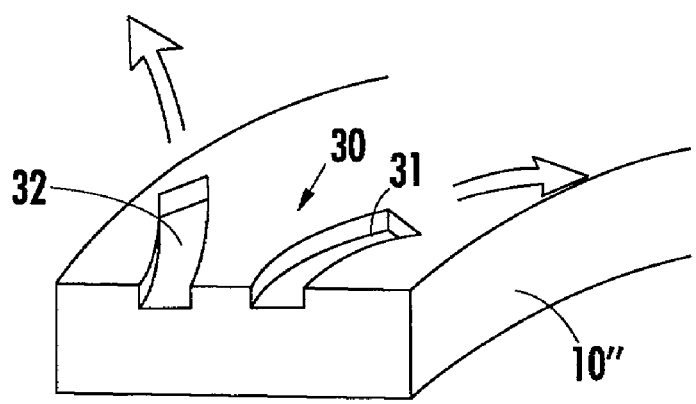
FIG. 5 is a partial schematic view taken along line 5—5 of FIG. 3.
Figure 6:
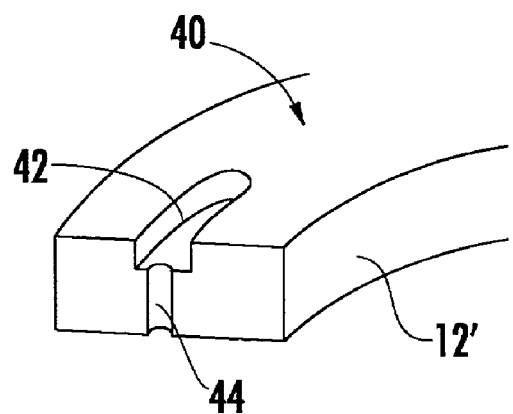
FIG. 6 is a partial cross-sectional view taken along line 6—6 of FIG. 4.

Typically, rotor 10', FIGS. 3 and 5 includes sealing face 30 with a number of pumping grooves 31, 32 therein. One set of pumping grooves as shown at 32 each start proximate the center portion of sealing face 30 and extend outward towards the outer diameter of rotor 10'. Another set of pumping grooves as shown at 31 start proximate the center portion of the sealing face 30 but extend inwardly toward the inner diameter of rotor 10'. Stator 12', FIGS. 4 and 6 then includes sealing face 40 with discontinuous fluid feeding groove sections 42 therein proximate the center of sealing face 40. Each fluid feeding groove section has an orifice 44 extending through the thickness of stator 12'. Air is directed through the orifices 44 as rotor 10' rotates and is fed to the center portion of sealing face 30 of stator 12', FIG. 3 and then pumped, as shown in FIG. 5, simultaneously both inwardly by groove set 31 and outwardly by groove set 32 to provide a uniform fluid film thickness between the sealing faces of the two sealing rings when one sealing face cones due to thermal and/or pressure effects.

In one example, rotor 10', made of silicon nitride, was 9.8 inches outside diameter, 7 inches inside diameter, and 0.529 inches thick. The depth of each pumping groove was 0.00055 inches and they were 0.445 inches wide. In this same example, stator 12', FIG. 4 was 9.6 inches outside diameter, 7.8 inches inside diameter, and 0.35 inches thick made of carbon. The depth of each fluid feeding groove section was 0.020, and they were all 0.1 inches wide and 0.645 inches long. The diameter of each orifice 44 was 0.02 inches.

Figure 7:
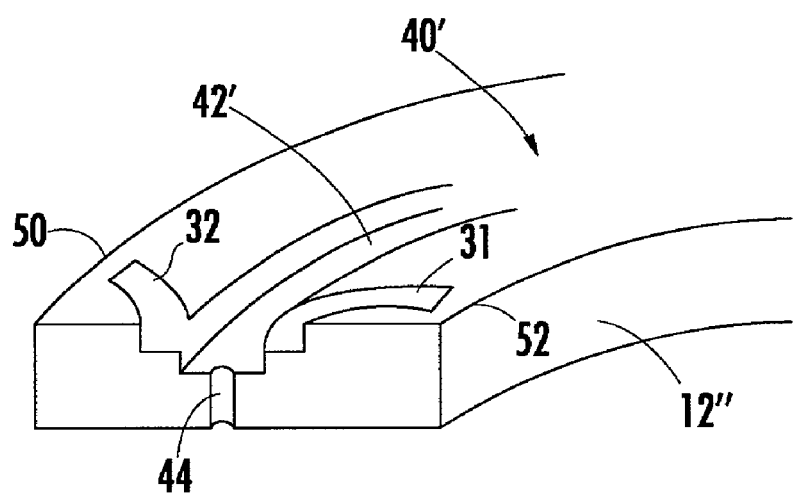
FIG. 7 is a schematic cross-sectional view showing another embodiment of the sealing face for one portion of the rotary face seal assembly of the subject invention.

In another embodiment, the stator (or, alternatively, the rotor) as shown at 12'', FIG. 7 includes both the inwardly 31 and outwardly 32 pumping grooves and also centrally located continuous feeding groove 42 with orifices 44 therein. The rotor (or, alternatively, the stator) in this example would then have a smooth sealing face.

The terminal ends of pumping grooves 32 terminate inward of the outer portion 50 of sealing face 40' and the terminal ends of pumping grooves 31 terminate inwardly of inner portion 52 of sealing face 40'. Thus, outer portion 50 and inner portion 52 of sealing face 40' form dams and the area between the pumping grooves form lands.

Figure 8:
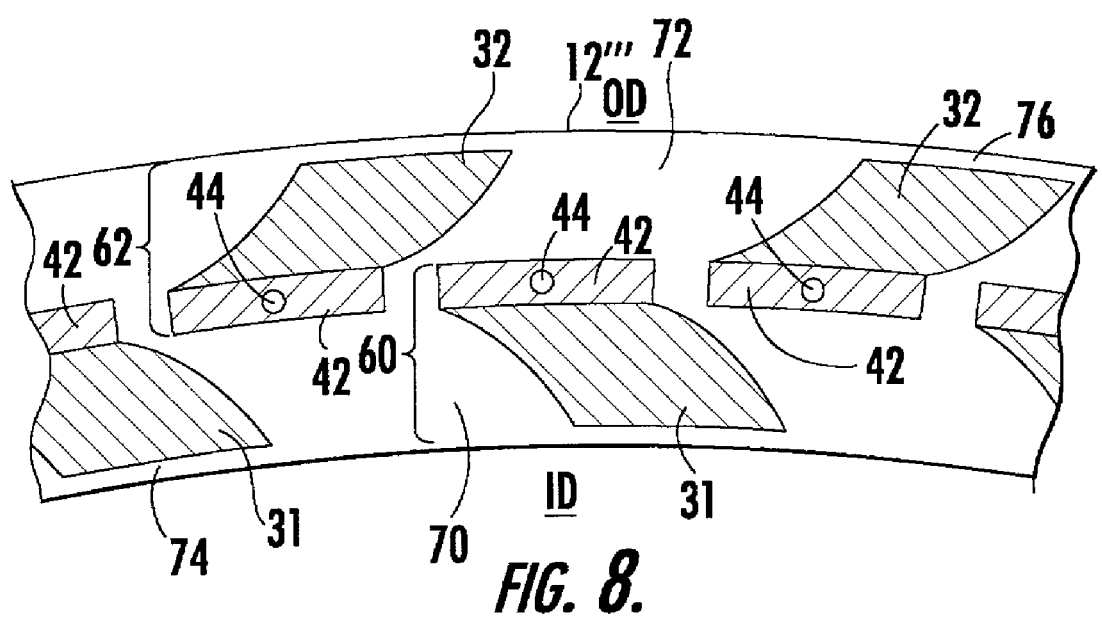
FIG. 8 is a schematic view showing another possible face seal layout in accordance with one embodiment of the subject invention.

Thus far, the inwardly and outwardly extending pumping grooves have been shown to start adjacent to each other. In FIG. 8, an offset design is shown wherein stator 12''' includes feeding groove sections 42 each alternating to have an outwardly extending pumping groove 32 and then an inwardly extending pumping groove 31. The sealing face of the stator (or the rotor) may thus be viewed as having two sections, inner section 60 and outer section 62. Typically, stator ring 12''' is mounted in a holder which runs against a rotating ring (a rotor) attached to the rotating part of a gas turbine engine. Stator ring 12''' is designed to be flexible and adaptive to the rotor sealing face. In order to enable the seal to recover from positive or negative coning, the sealing face of stator 12''' includes seal sections 60 and 62 separated by either segmented (or continuous) centrally located feeding grooves 42. Each seal section 60, 62 contains a hydrodynamic section, formed by alternative pumping grooves 31, 32, lands 70, 72, and dam sections 74, 76 near the sealing face edges. System fluid or gas, which is allowed to leak in a small amount, is fed into feed-grooves 42 of the face seal through restricted feeding holes 44 and pumped inwardly and outwardly simultaneously by specially designed grooves 31, 32 on the stator (or/and the rotor). Preferably, the system fluid originates from the side with the higher pressure or higher density.

One primary advantage of this design is its adaptability to seal face coning. No matter which way the seal faces cone, one seal section 60, 62 with smaller clearance will form a convergent film and generate a larger than usual opening force and the other seal section with a larger clearance will form a divergent film and generate a smaller opening force than usual. Therefore, both of the seal sections 62 and 60 work together to restore a uniform film thickness. This aspect of the invention is discussed further with respect to FIGS. 16–20.

Figure 9:
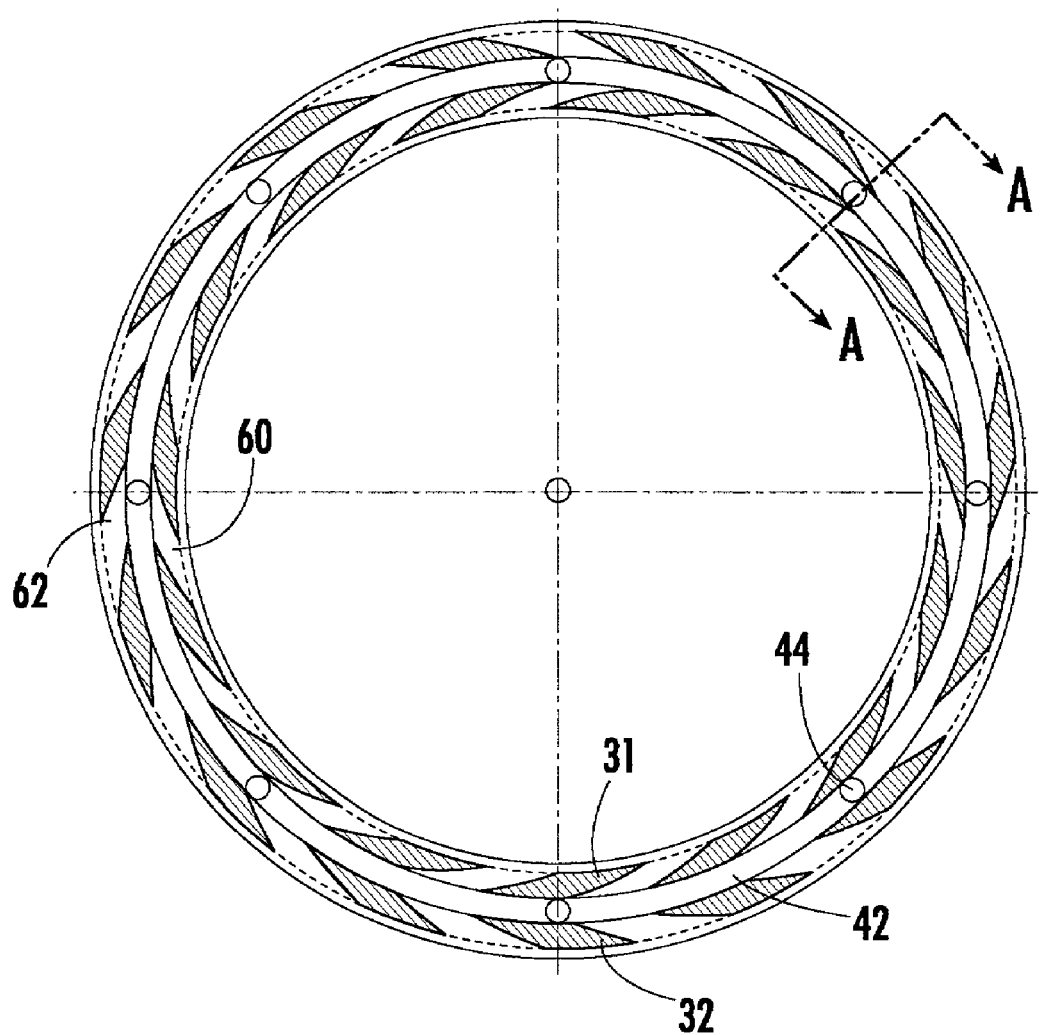
FIG. 9 is a schematic view showing still another possible face seal layout for the face seal assembly of the subject invention.
Figure 10:
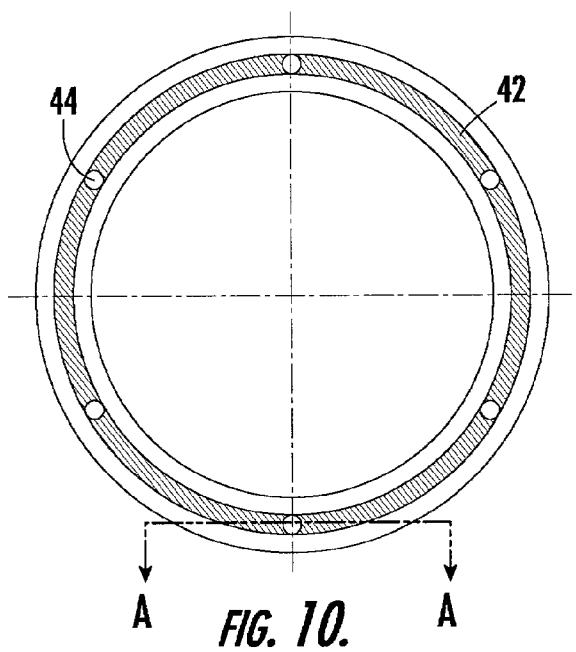
FIG. 10 is a view of the sealing face of a stator or rotor in accordance with the subject invention.
Figure 11:
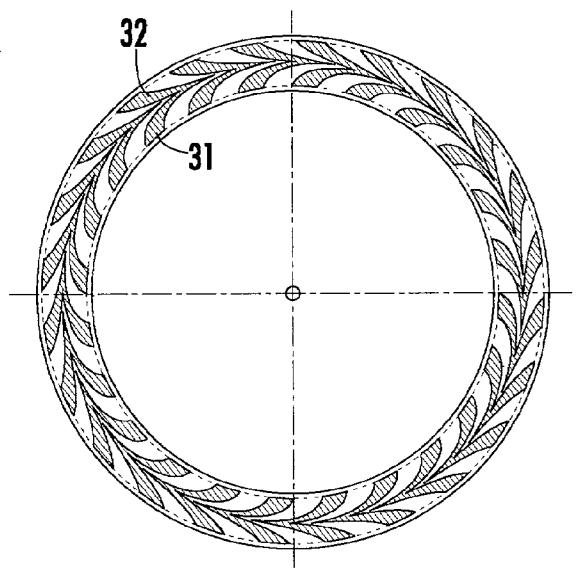
FIG. 11 is a schematic view showing the sealing face of a rotor or stator in accordance with the subject invention.
Figure 12:
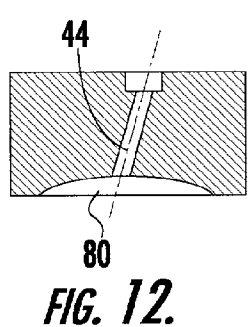
FIGS. 12 and 13 are partial cross-sectional views showing two different embodiments of the rotor shown in FIG. 10 taken along line A—A.
Figure 13:
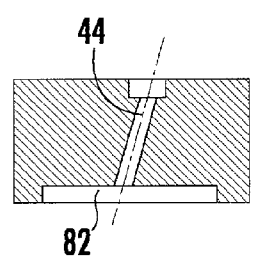

Typically, the feeding grooves are not segmented as shown in FIG. 9 for manufacturing reasons. The seal face pattern shown in FIG. 9 can be on the face of the stator ring or the rotor ring or can be a combination of imprints on the rotor and stator faces. The number of pairs of grooves and lands can be different for the inner and outer seal sections 60, 62. Inwardly extending pumping grooves 31 and outwardly extending pumping grooves 32 are typically very shallow, only 200–900 micro inches in depth. In the example shown in FIGS. 10–13, pumping grooves 31 and 32 are on the sealing face of the rotor and the feeding groove 42 is on the sealing face of the stator. In this example, the rotor is made of a hard material and the deep feeding groove 42 can be round at the bottom as shown at 80 in FIG. 12 or square at the bottom as shown at 82 in FIG. 13. Alternatively, feeding hole 44 and feeding groove 42 can be on the rotor face and pumping grooves 31 and 32 on the stator. As shown in FIGS. 12 and 13, feeding holes 44 are typically disposed at an angle with the rotating axis against the rotation direction to thereby provide more effective fluid feeding.

Figure 14:
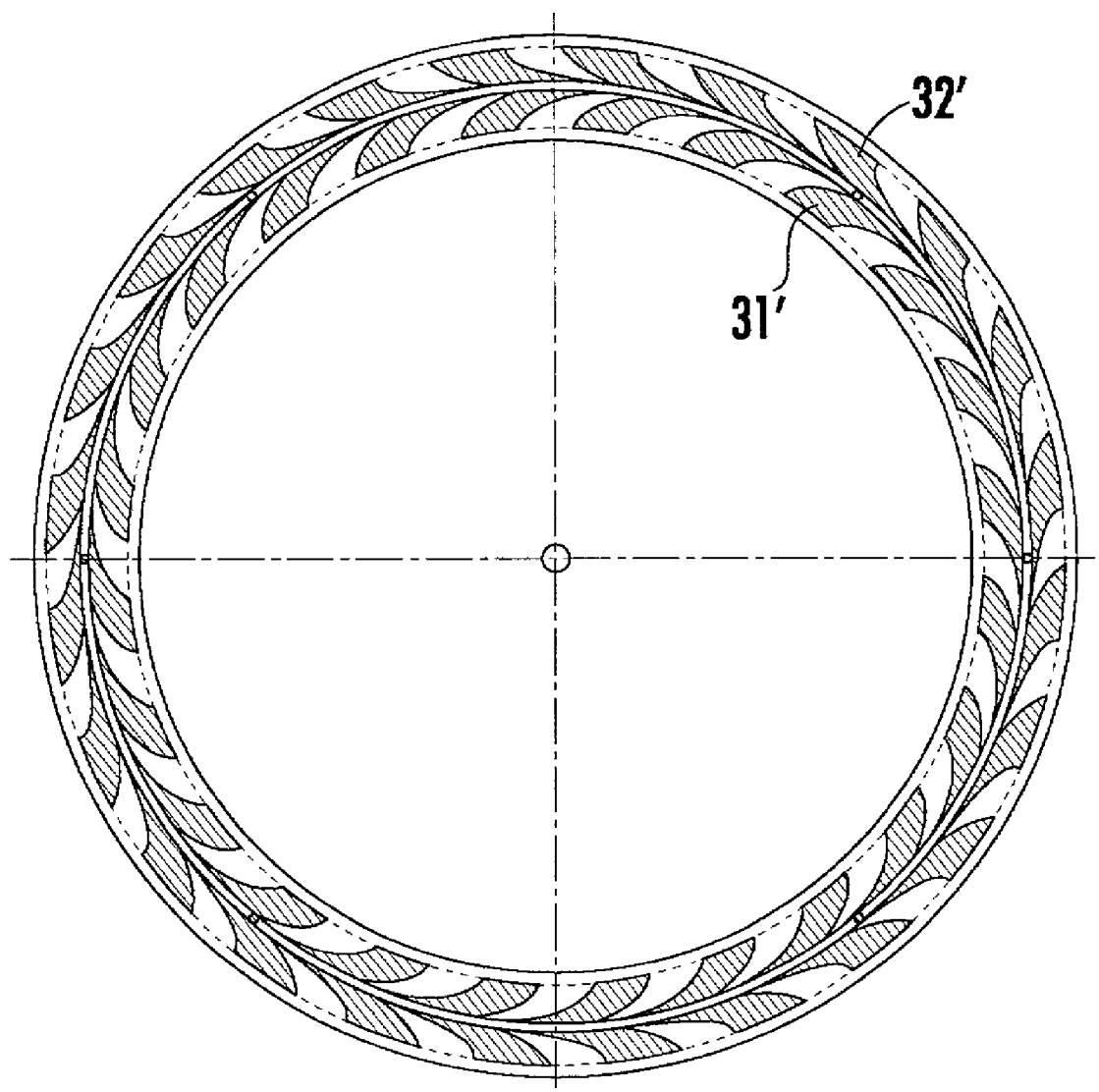
FIG. 14 is a schematic view showing an alternative groove profile for the sealing face of either the stator or the rotor in accordance with the subject invention.

One unique feature of the subject invention is that, in any embodiment, the face seal pumps fluid from the inside to the inner and outer edges of the sealing rings. This allows the seal to properly work in extreme conditions of severe face deflection. Since the fluid enters from the center, face coning will never cut off fluid from getting into the sealing face. The groove profiles are designed to have desirable pumping effects and film stiffness. The pumping grooves can have a spiral pattern usually approximated by circular arcs for ease of manufacture. As shown in FIG. 14, however, both the inside and outside edges of each pumping groove curve inwardly towards the center of the sealing face. In the design shown in FIG. 9, the set of inwardly directing pumping grooves 31 curve inwardly from the center portion of the sealing face and the set of outwardly directed pumping grooves 32 curve outwardly from the center portion of the sealing face. In the preferred embodiment, the width of the pumping grooves greatly exceeds their depth.

Figure 15:
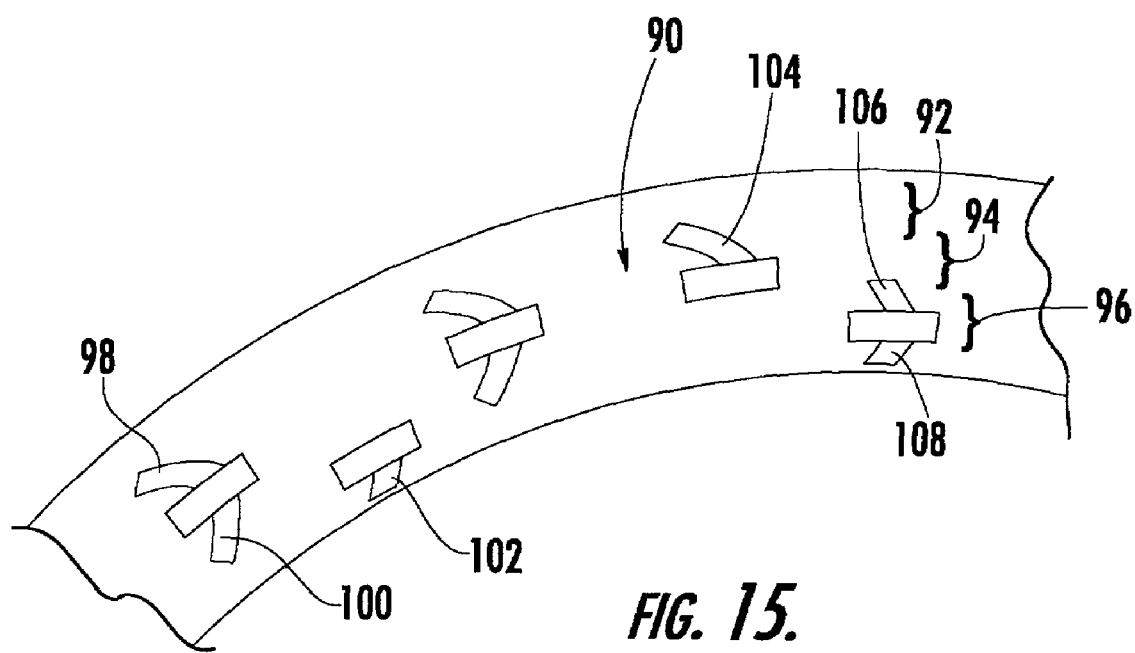
FIG. 15 is a partial schematic view showing still another alternative groove profile for the sealing face of the stator or the rotor in accordance with the subject invention.

In still another embodiment, there are more than two seal face sections as shown in FIG. 15 wherein sealing face 90 includes three seal face sections 92, 94, and 96. As shown, outwardly extending pumping groove 98 is located in sealing face section 92, inwardly directed pumping groove 100 is located in sealing face section 94, and inwardly directed pumping groove 102 is located in sealing face section 96. Alternatively, outwardly directed pumping groove 104 is located in sealing section 92, outwardly directed pumping groove 106 is located in sealing section 94, and inwardly directed pumping groove 108 is located in sealing section 96.

Figure 16:
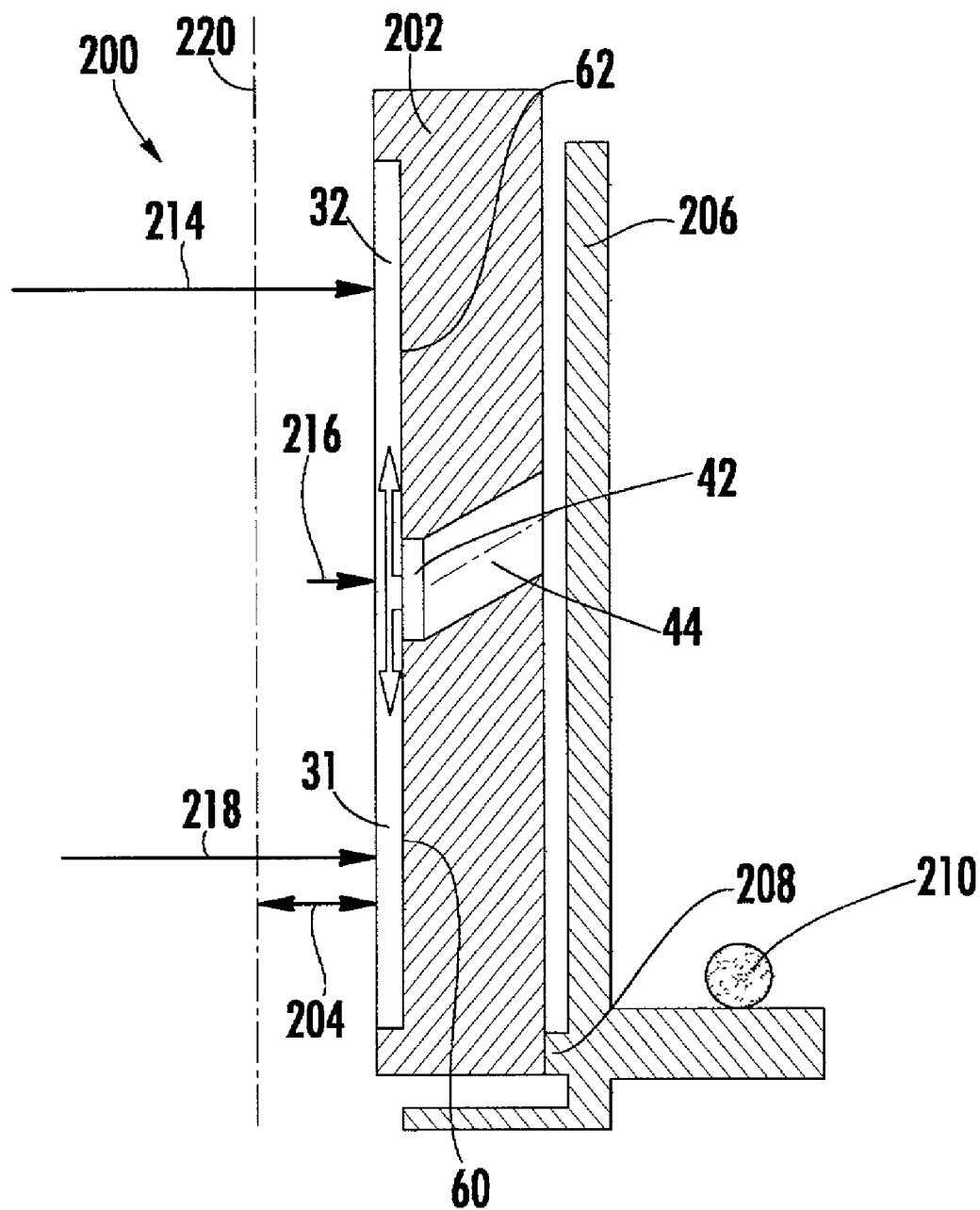
FIG. 16 is a side cross-sectional view showing the face seal assembly of the subject invention where there is no deflection of the rotor.

In FIG. 16, the face of the rotor ring is shown as line 220 and the pressure profile acting thereon is shown at 200. In this example, stator ring 202 includes the groove profile shown in FIG. 9. The fluid film gap is shown at 204. Stator holder 206 backseat 208 holds stator sealing ring 202 in place and prevents rotation thereof. There may also be a secondary seal as shown at 210. Typically, stator ring 202 is designed to be flexible in terms of coning deflection and therefore the thickness of stator ring 202 is chosen to be as small as the manufacturing process will allow to maintain the flatness of the sealing face. The flexibility of stator ring 202 combined with the restoration capability of the sealing face as discussed above makes the seal highly adaptive to coning of the rotor ring face. If coning causes a divergent gap 204 from the outer diameter to the inner diameter, the coning is defined as negative coning. If the coning by either the stator or the rotor causes a convergent sealing gap 204 between the stator and rotor sealing faces, the coning is defined as positive coning. FIG. 16 shows a typical pressure distribution 200 on the seal face at a design operation condition. Here, the rotor sealing face and the stator 202 sealing face are shown in a parallel orientation. The total forces from the outer seal section 62, the feeding groove, and the inner section 60 and their equivalent acting positions are illustrated by vectors 214, 216, and 218, respectively. In this condition, stator ring 202 experiences a net moment of zero.

Figure 17:
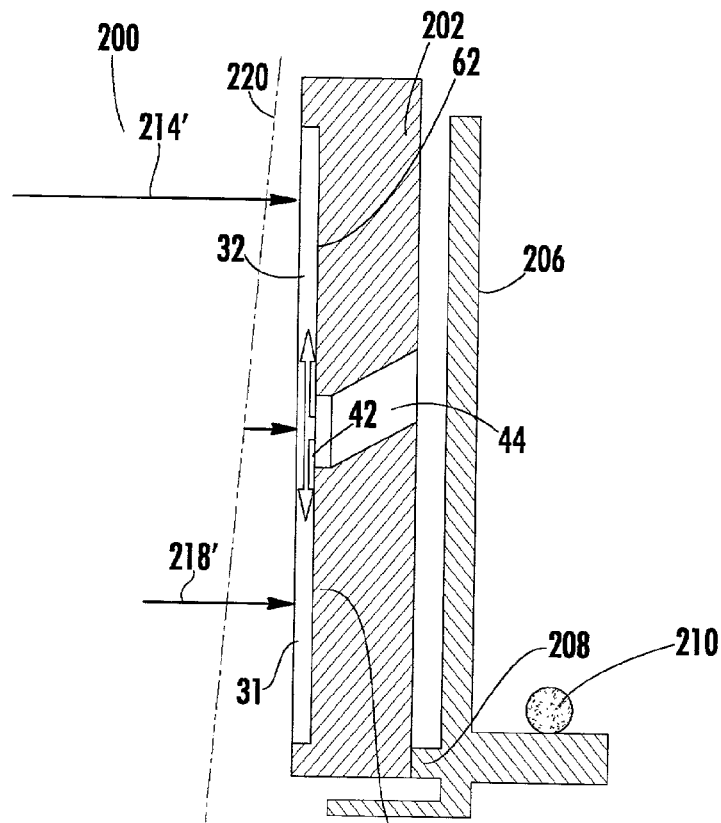
FIG. 17 is a side cross-sectional view showing the pressure profile when the rotor begins to have negative coning.

As shown in FIG. 17, however, when the rotor face deflects as shown by line 220 and causes negative coning, outer seal section 62 is working in a convergent film which makes outer pumping groove 32 in the sealing face of stator 202 work more effectively to create higher pressure in the hydrodynamic section. This is represented by vector 214'. Therefore, the outer seal section 62 generates more positive moment to open up the clearance at the outer diameter of the respective sealing faces. Meanwhile, the inner seal section 60 is working at a divergent film. This reduces the hydrodynamic effects of the inwardly directed grooves 31. There is less pressure and therefore less negative moment generated by the inner seal section as shown by vector 218'. A net increase of positive moment causes stator ring 202 to cone positively which forms a uniform film thickness as shown in FIG. 18.

Figure 19:
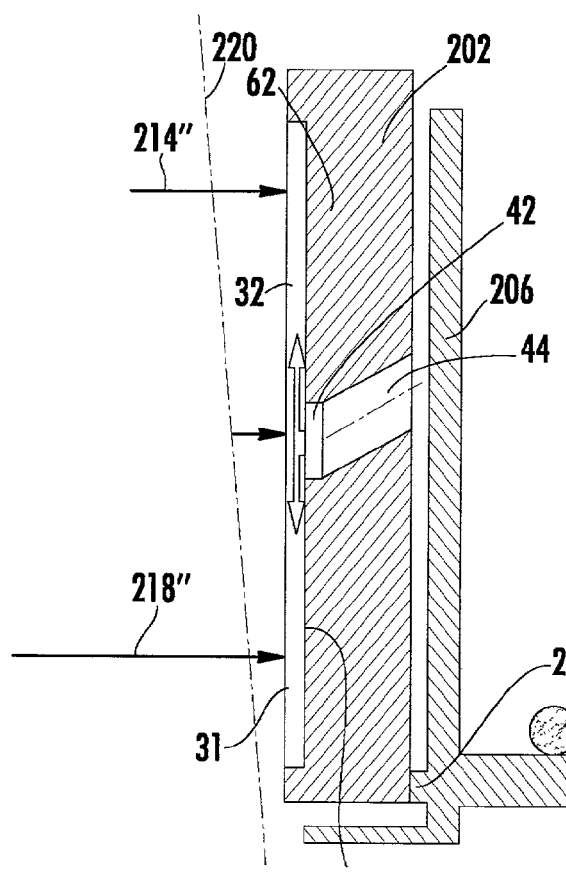
FIG. 19 is a side cross-sectional view showing the pressure profile when the rotor starts to cone positively.
Figure 20:
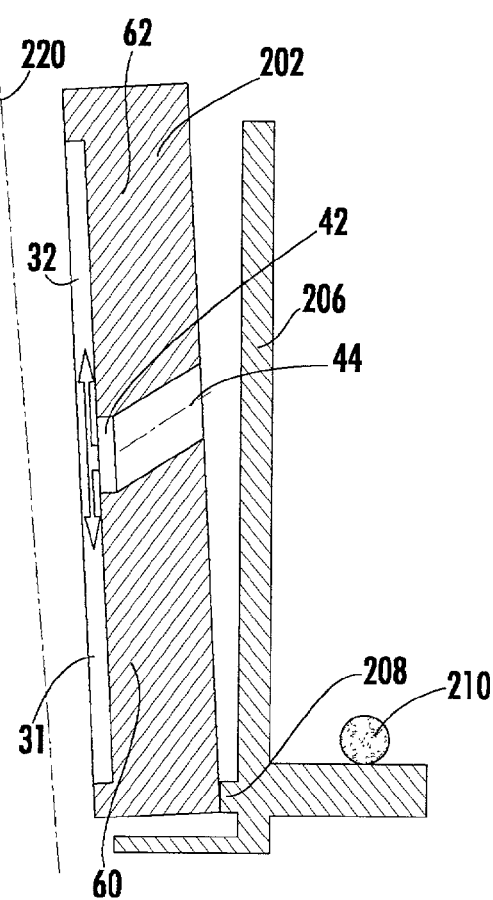
FIG. 20 is a view similar to FIG. 19 except now the stator has coned in a negative direction in response to the positive coning of the rotor.

Conversely, when rotor face deflections cause positive coning as shown at 220 in FIGS. 19 and 20, the outer seal section 62 is working in a divergent film which makes the outwardly directed pumping grooves 32 work less effectively to create a high pressure zone in the hydrodynamic section. Therefore, outer seal section 62 generates less positive moment as shown by vector 214". Meanwhile, the inner seal section is working at a convergent film which increases the hydrodynamic effects of the inwardly directed grooves 31. There is more pressure, and therefore a larger negative moment generated by inner seal section 60 as shown by vector 218". The net increase of negative moment causes stator ring 202 to cone negatively and form a uniform film thickness as shown in FIG. 20.

Figure 18:
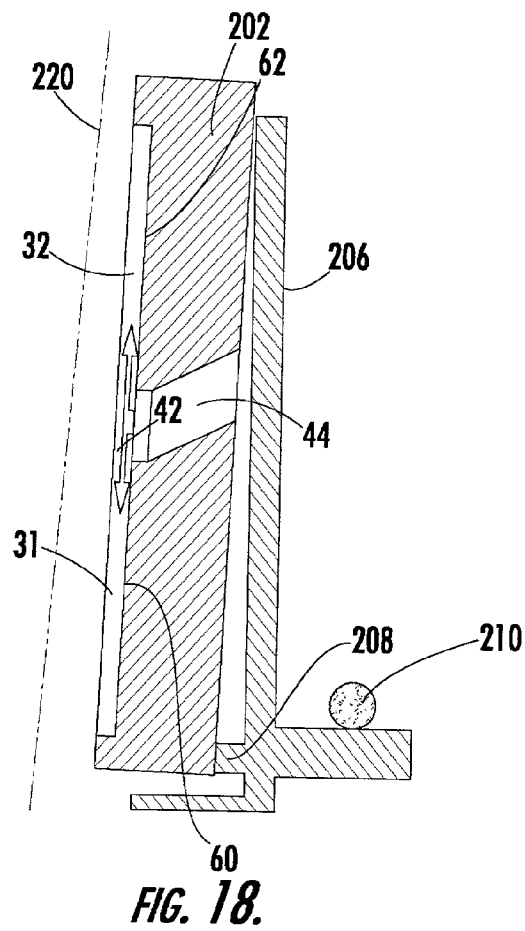
FIG. 18 is a side cross-sectional view similar to FIG. 17 except now the stator has coned in a positive direction in response to the negative coning of the rotor.

In other words, negative coning of the rotor prompts the stator ring to cone positively as shown in FIGS. 17 and 18 and positive coning of the rotor prompts the stator ring to cone negatively as shown in FIGS. 19 and 20. The actual relative magnitude of the motion of the rotor and the stator shown in the figures above is exaggerated for the purpose of illustration and it should be also understood that the rotor and stator rings bend slightly as they deform but not as significantly as coning.

In summary, for large diameter seals, the conventional film stiffness in the axial direction is not adequate to qualify seal stability. The ability of a seal to recover from coning is also crucial to seal robustness. Axial film stiffness and coning film stiffness are related, though they are different. Coning film stiffness maintains the two seal faces in near parallel position so that the axial film stiffness can act effectively to keep the stator ring following the axial motion of the rotor ring when there are rotor runouts. If the coning film stiffness is not enough to keep the seal faces from large coning, the axial film stiffness will be lost too and the seal will not be able to perform well in dynamic tracking.

As discussed with reference to FIG. 4, feeding groove pockets 42 provide fluid supply for the outer and inner pumping grooves 31 and 32, FIG. 3. In one embodiment shown in FIG. 8, if there is negative coning, the inner seal section opens up and has a large leakage. Feeding holes 44, FIG. 4 serve as flow control orifices to limit fluid supply. Therefore, the inner section is working in a starving condition producing much less opening force. This mechanism helps reduce the face coning, or in other words, increase coning film stiffness. Meanwhile, the outer seal section is working in the converging film with little dam opening. The flow amount needed is reduced. As a result, the pressure drop through the feeding holes is reduced because there is less flow going through. Therefore, the outer seal section will produce larger opening forces to help the seal recover from coning. In other words, the coning film stiffness is therefore enhanced.

The restricted feeding orifice design is also effective to improve axial film stiffness because the pressure between the seal faces is not dependent only on the hydrodynamic effects of the spiral groove which is a function of film thickness but also affected by the hydrostatic effects of the restricted orifice. The pressure in the feeding groove is strongly dependent on the flow amount through the feeding holes.

As the film thickness increases, the pressure drop through the feeding hole increases. The opening force will drop as a result of lower pressure in the seal faces. Even with a very thin film, the double spiral pumping grooves alone can generate enough film stiffness, the restricted feeding holes can be designed in such a way that it is most effective at relatively thick films so that the seal has a large film stiffness in a wide range of film thicknesses. In other words, once the seal faces open up, the hydrodynamic effect from spiral groove diminishes gradually, a hydrostatic effect kicks in to continue the strong dependency of opening forces on film thickness. Additional data concerning this effect is provided in the article entitled "Adaptive Divert Double-Spiral Groove Face Seals for High Speed, High Temperature Applications", by the inventors hereof published by the American Institute of Aeronautics, 2000, hereby incorporated herein by this reference.

The use of the restricted orifice also enables retraction of the stator when a pressure differential across the seal is small. During start-up and shutdown conditions, the hydrodynamic lift force which is proportional to rotor speed, may not be enough for separation.

Figure 21:
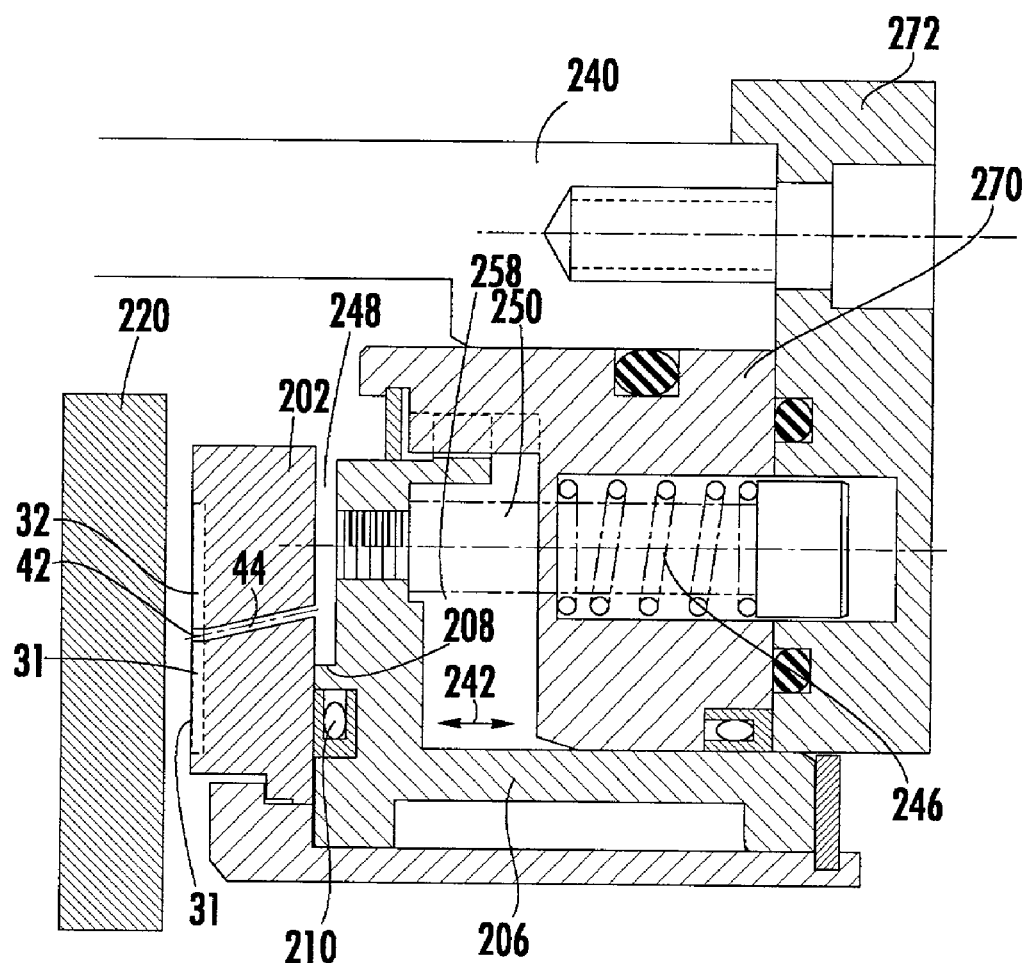
FIG. 21 is a more complete cross-sectional view showing the rotary face seal assembly of the subject invention in place in a turbomachine.

As shown in FIG. 21, rotor 220 and stator 202 are shown in place in a portion of a gas turbine having a stationary part 240 and a rotating part upon which rotor 220 is mounted. Again, stator 202 has a sealing face configuration as shown in FIG. 9. Stator holder 206 is movable with stator 202 in the direction shown by arrow 242. Spring 246 biases stator ring 202 apart from rotor 220. Gap 248 between stator holder 206 and stator 202 and gap 258 between stator holder 204 and fixture 270 are at system pressure which, when high enough, overcomes the spring force of spring 246 to thus bring stator 202 and holder 204 in close proximity to rotor 220 separated by the fluid film as discussed above. Typically, holder 206 includes shaft 250 fixed thereto and spring 246 is disposed about shaft 250 and abutting non-movable structure 270 fixed with respect to structure 272 which is fixed to or a part of stationary engine part 240.

Since the pressure difference across stator ring 202 vanishes during engine start-up and shutdown, the spring force supplied by spring 246 pulls stator 202 away from the face of rotor 220 and prevents the seal faces from touching and rubbing against each other. When the engine operates at high speed, the pressure difference reaches a predetermined level, the closing force from the pressure drop over the restricted orifices overcomes the spring force of spring 246 and draws stator ring 202 towards rotor 220. See also the article entitled "Dynamic Analysis of An Aspiring Face Seal for Aircraft Engine Application" by Bayepalli, et al., published by the American Institute of Aeronautics and Astronautics (AIAA), 1996, incorporated herein by this reference.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A rotary seal assembly comprising:
   a first member having a sealing face;
   a second member having a sealing face with a number of pumping grooves therein, at least a first set of pumping grooves starting proximate a center portion of the sealing face of the second member and extending outward towards the outer diameter of the second member and at least a second set of pumping grooves starting proximate the center portion of the sealing face of the second member and extending inward towards the inner diameter of the second member to direct fluid fed to the center portion of the sealing face simultaneously both inwardly and outwardly from the center portion of the sealing face of the second member to provide a uniform fluid film thickness between the sealing faces of the first and second members when one sealing face cones due to thermal and/or pressure effects;
   a holder mounted to one of said first or second members and movable therewith, and a spring which biases the first and second members apart, a gap between the holder and the said first or second member responsive to system pressure which overcomes the spring at a predetermined level; and
   a feeding groove for providing fluid to the center portion of the sealing face of the second member; said feeding groove being discontinuous forming a number of feeding groove sections.

2. The rotary seal assembly of claim 1 in which the feeding groove is in the first member.

3. The rotary seal assembly of claim 1 in which the feeding groove is in the second member and positioned at the center portion of the sealing face thereof.

4. The rotary face seal assembly of claim 1 in which each feeding groove section has an orifice therein.

5. The rotary face seal assembly of claim 4 in which the orifices are angled.

6. The rotary face seal assembly of claim 1 in which the first member is a stator ring.

7. The rotary face seal assembly of claim 6 in which the second member is a rotor ring.

8. The rotary face seal assembly of claim 1 in which the first member is a rotor ring.

9. The rotary face seal assembly of claim 8 in which the second member is a stator ring.

10. The rotary face seal assembly of claim 1 in which the first set of pumping grooves each have a terminal end located inward of an outer portion of the sealing face of the second member.

11. The rotary face seal assembly of claim 1 in which the second set of pumping grooves each have a terminal end located inward of an inner portion of the sealing face of the second member.

12. The rotary face seal assembly of claim 1 in which the first set of pumping grooves and the second set of pumping grooves start adjacent each other at the center portion of the sealing face of the second member.

13. The rotary face seal assembly of claim 1 in which the starting position of the first set of pumping grooves are offset from the starting position of the second set of pumping grooves.

14. The rotary face seal assembly of claim 1 in which the first set of pumping grooves curve outwardly from the center portion of the sealing face of the second member.

15. The rotary face seal assembly of claim 1 in which the second set of pumping grooves curve inwardly from the center portion of the sealing face of the second member.

16. The rotary face seal assembly of claim 1 in which all the pumping grooves have a width greatly exceeding their depth.

17. The rotary face seal assembly of claim 1 in which each pumping groove has an inside edge and an outside edge, both edges curving inwardly.

18. The rotary face seal assembly of claim 1 in which each set of pumping grooves includes the same number of pumping grooves.

19. The rotary face seal assembly of claim 1 in which the feeding groove has a rounded bottom.

20. The rotary face seal assembly of claim 1 in which the feeding groove has a square bottom.

21. The rotary face seal assembly of claim 1 in which the holder includes a shaft fixed thereto, the spring disposed about the shaft and abutting a non-movable member.

22. The rotary face seal assembly of claim 1 further including a holder for one of said members configured to allow said member to cone negatively when the other member cones positively and allows said member to cone positively when the other member cones negatively.

23. A rotary seal assembly comprising:
a first member having a sealing face with feeding orifices therein which are positioned in a discontinuous feeding groove in the first member forming a number of feeding groove sections;
a second member having a sealing face with a number of pumping grooves therein, at least a first set of pumping grooves starting proximate a center portion of the sealing face of the second member and extending outward towards the outer diameter of the second member and at least a second set of pumping grooves starting proximate the center portion of the sealing face of the second member and extending inward towards the inner diameter of the second member to direct fluid fed to the center portion of the sealing face of the second member by the feeding orifices of the first member simultaneously both inwardly and outwardly from the center portion of the sealing face of the second member to provide a uniform fluid film thickness between the sealing faces of the first and second members when one sealing face cones due to thermal and/or pressure effects; and
a holder mounted to whichever member is the stator and movable therewith, and a spring which biases the first and second members apart, a gap between the holder and the stator member responsive to system pressure which overcomes the spring at a predetermined level.

24. The rotary face seal assembly of claim 23 in which each feeding groove section has an orifice extending through the thickness of the first member.

25. The rotary face seal assembly of claim 24 in which the orifices are angled.

26. The rotary face seal assembly of claim 23 in which the first member is a stator ring.

27. The rotary face seal assembly of claim 23 in which the second member is a rotor ring.

28. The rotary face seal assembly of claim 23 in which the first member is a rotor ring.

29. The rotary face seal assembly of claim 28 in which the second member is a stator ring.

30. The rotary face seal assembly of claim 23 in which the first set of pumping grooves each have a terminal end located inward of an outer portion of the sealing face of the second member.

31. The rotary face seal assembly of claim 23 in which the second set of pumping grooves each have a terminal end located inward of an inner portion of the sealing face of the second member.

32. The rotary face seal assembly of claim 23 in which the first set of pumping grooves and the second set of pumping grooves start adjacent each other at the center portion of the sealing face of the second member.

33. The rotary face seal assembly of claim 23 in which the starting position of the first set of pumping grooves are offset from the starting position of the second set of pumping grooves.

34. The rotary face seal assembly of claim 23 in which the first set of pumping grooves curve outwardly from the center portion of the sealing face of the second member.

35. The rotary face seal assembly of claim 23 in which the second set of pumping grooves curve inwardly from the center portion of the sealing face.

36. The rotary face seal assembly of claim 23 in which all the pumping grooves have a width greatly exceeding their depth.

37. The rotary face seal assembly of claim 23 in which each pumping groove has an inside edge and an outside edge, both edges curving inwardly.

38. The rotary face seal assembly of claim 23 in which each set of pumping grooves includes the same number of pumping grooves.

39. The rotary face seal assembly of claim 23 in which the feeding groove sections of the first member have rounded bottoms.

40. The rotary face seal assembly of claim 23 in which the feeding groove sections of the first member have square bottoms.

41. The rotary face seal assembly of claim 23 in which the holder includes a shaft fixed thereto, the spring disposed about the shaft and abutting a non-movable member.

42. The rotary face seal assembly of claim 23 further including a holder for one of said first or second members configured to allow that member to cone negatively when the other member cones positively and allows that member to cone positively when the other member cones negatively.

43. A rotary face seal assembly comprising:
a stator having a sealing face;
a rotor having a sealing face in close proximity to the sealing face of the stator;
a holder for the stator having a back seat which allows the stator to cone negatively when the rotor cones positively and vice versa;
a spring which biases the stator and the rotor apart;
a gap between the holder and the stator responsive to system pressure which overcomes the spring at a predetermined level;
the sealing face of the rotor or the stator partitioned into at least first and second sections, the first section having pumping grooves which extend inwardly towards the inner diameter of the sealing face of the rotor or the stator, the second section having pumping grooves which extend outwardly towards the outer diameter of the sealing face of the rotor or the stator; and
the sealing face of the rotor or the stator having feeding orifices therethrough to direct fluid to the inwardly directed pumping grooves and the outwardly directed pumping grooves simultaneously thereby causing the stator to cone negatively when the rotor cones positively and vice versa, the feeding orifices disposed in a discontinuous feeding groove forming a number of feeding groove sections.

44. The assembly of claim 43 in which the outwardly extending pumping grooves start proximate a center portion of the sealing face of the rotor or the stator and extend outward, and the inwardly extending pumping grooves start proximate the center portion of the sealing face of the rotor or the stator and extend inward to direct fluid fed to the center portion of the sealing face of the rotor by the orifices simultaneously both inwardly and outwardly from the center portion of the sealing face of the rotor.

45. The rotary face seal assembly of claim 43 in which each feeding groove section has an orifice therein.

46. The rotary face seal assembly of claim 45 in which the orifices are angled.

47. The rotary face seal assembly of claim 43 in which the orifices are angled.

48. The rotary face seal assembly of claim 43 in which the stator sealing face has the pumping grooves.

49. The rotary face seal assembly of claim 43 in which the sealing face of the rotor has the pumping grooves.

50. The rotary face seal assembly of claim 43 in which the rotor sealing face has the orifices.

51. The rotary face seal assembly of claim 43 in which the stator sealing face has the orifices.

52. The rotary face seal assembly of claim 43 in which the outwardly directed pumping grooves each have a terminal end located inward of an outer portion of the sealing face.

53. The rotary face seal assembly of claim 43 in which the inwardly directed pumping grooves each have a terminal end located inward of an inner portion of the sealing face.

54. The rotary face seal assembly of claim 43 in which all the pumping grooves start adjacent each other at the center portion of the sealing face.

55. The rotary face seal assembly of claim 43 in which the starting position of the pumping grooves are offset.

56. The rotary face seal assembly of claim 43 in which all the pumping grooves have a width greatly exceeding their depth.

57. The rotary face seal assembly of claim 43 in which each pumping groove has an inside edge and an outside edge, both edges curving inwardly.

58. The rotary face seal assembly of claim 43 in which each section includes the same number of pumping grooves.

59. The rotary face seal assembly of claim 43 in which the holder includes a shaft fixed thereto, the spring disposed about the shaft and abutting a non-movable member.

* * * * *